(12) United States Patent
Kakolaki et al.

(10) Patent No.: US 9,378,027 B2
(45) Date of Patent: Jun. 28, 2016

(54) FIELD-PROGRAMMABLE MODULE FOR INTERFACE BRIDGING AND INPUT/OUTPUT EXPANSION

(71) Applicants: Behrooz K. Kakolaki, Newmarket (CA); Darlington C. Opara, Richmond Hill (CA)

(72) Inventors: Behrooz K. Kakolaki, Newmarket (CA); Darlington C. Opara, Richmond Hill (CA)

(73) Assignee: Advanced Micro Devices, Inc., Sunnyvale, CA (US)

( * ) Notice: Subject to any disclaimer, the term of this patent is extended or adjusted under 35 U.S.C. 154(b) by 185 days.

(21) Appl. No.: 13/726,829

(22) Filed: Dec. 26, 2012

(65) Prior Publication Data

US 2014/0181491 A1    Jun. 26, 2014

(51) Int. Cl.
*G06F 17/50* (2006.01)
*G06F 9/44* (2006.01)
*G06F 15/78* (2006.01)

(52) U.S. Cl.
CPC .......... *G06F 9/4411* (2013.01); *G06F 15/7867* (2013.01); *Y02B 60/1207* (2013.01); *Y02B 60/1225* (2013.01)

(58) Field of Classification Search
USPC ........................................................ 716/117
See application file for complete search history.

(56) References Cited

U.S. PATENT DOCUMENTS

| | | | |
|---|---|---|---|
| 2003/0110429 A1* | 6/2003 | Bailis et al. | 714/725 |
| 2007/0186203 A1* | 8/2007 | Sueyoshi et al. | 716/16 |
| 2008/0127065 A1* | 5/2008 | Bryant et al. | 717/109 |
| 2009/0160483 A1* | 6/2009 | Verma et al. | 326/41 |
| 2011/0260318 A1* | 10/2011 | Eisenstadt | 257/737 |
| 2011/0289263 A1* | 11/2011 | McWilliams et al. | 711/103 |
| 2014/0047137 A1* | 2/2014 | Mathason et al. | 710/33 |

* cited by examiner

*Primary Examiner* — Mohammed Alam

(57) ABSTRACT

One or more specialized field programmable modules (e.g. CPLD and FPGA blocks) and their programming interface are embedded into a processing system (e.g. a CPU, GPU, APU and/or chipset). The field programmable modules are in-system programmable, in contrast to the application specific integrated circuit (ASIC) modules that perform the core functions of the processing system. The programmable flexibility of the field programmable modules can have various benefits during different stages of the integrated circuit life cycle for the processing system, such as reconfigurable interface bridging and two-way I/O expansion.

16 Claims, 6 Drawing Sheets

FIELD-PROGRAMMABLE MODULE FOR INTERFACE BRIDGING AND INPUT/OUTPUT EXPANSION

FIELD OF THE DISCLOSURE

The present disclosure relates to field programmable modules for processing systems.

BACKGROUND

Because an integrated circuit, such as a very large scale integration (VLSI) application specific integrated circuit (ASIC), is hardcoded in nature, it can be challenging to satisfy the dynamic feature requirements of system developers. For example, different electronic devices can employ different peripheral devices, each configured to communicate with the processing system according to a particular communication protocol. Typically, a set of peripherals is used to do perform interface bridging and input/output (I/O) expansion to facilitate communication between the ASIC and external devices. These peripherals are additional external components that must be laid on board to complete system design and board integration. However, these solutions have higher costs, greater power consumption, utilize more area on the board (higher printed circuit board cost), and have limited or no access to the main chip's registers.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

In some embodiments, one or more specialized field programmable modules (e.g. CPLD and FPGA blocks) and a corresponding programming interface are embedded in a processing system (e.g. a central processing unit (CPU), graphics processing unit (GPU), accelerated processing unit (APU) and/or chipset). The field programmable modules are in-system programmable, in contrast to the application specific integrated circuit (ASIC) modules that perform the core functions of the processing system. The programmable flexibility of the field programmable modules can have various benefits during different stages of the integrated circuit life cycle for the processing system, such as reconfigurable interface bridging and two-way I/O expansion. For example, the field programmable module can provide input/output protocol bridge that adjusts voltage magnitude, polarity, timing and other characteristics of input/output signals of the processing system. This programmability reduces the need for fixed components, such as resistors and other components embedded in a printed circuit board, to provide these adjustments. In addition, the field programmable module can provide other functionality for the processing system, including implementation of system initialization functions, and provision of an interface for peripheral components to registers of the processing system.

Solutions and applications such as netbooks, tablets, mobile devices and embedded systems that are extremely power-sensitive, cost-sensitive and space-sensitive can benefit from the specialized field programmable module. The highly reconfigurable module adds flexibility in order to satisfy the dynamic feature requirements of different manufacturers and system architects. The field programmable module provides for cost reduction, flexibility, performance enhancements, and size/power reduction.

Figure 1:
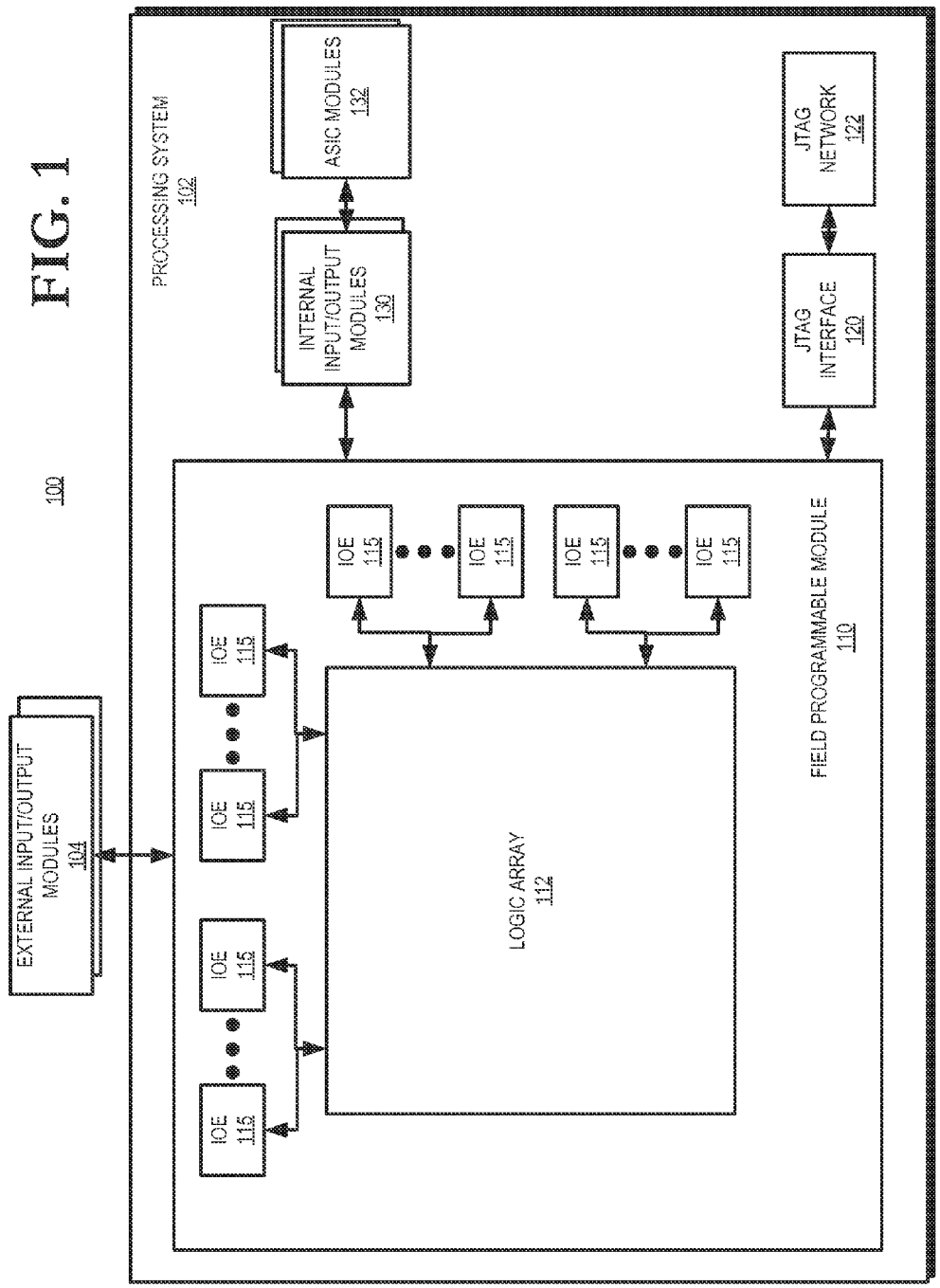
FIG. 1 is a block diagram of a processing system including a field programmable module to perform input/output expansion and interface bridging in accordance with some embodiments.

FIG. 1 illustrates a block diagram of an electronic device 100 including a processing system 102 connected to external input/output modules 104 in accordance with some embodiments. The processing system 102 can be a CPU, GPU, or APU, or can be a chipset that includes a CPU, GPU, or APU, a memory interface such as a Northbridge, and in some embodiments can further include memory modules, such as random access memory (RAM) modules. Accordingly, the electronic device 100 can be any device that includes a processing system such as, for example, a desktop or laptop computer, a server, a tablet computer, a portable electronic device such as a cell phone, a game system, and the like. The external input/output modules 104 can include any modules that facilitate data input and data output of the processing system 102. Thus, for example, the input/output modules 104 can include display interfaces, wireless radios, input device interfaces, audio device interfaces, data communication interfaces (e.g. bus interfaces), and the like, or any combination thereof.

The processing system 102 includes a field programmable module 110, internal input/output modules 130, and ASIC modules 132. The ASIC modules 132 include the modules to perform the core functionality of the processing system 102, and therefore can include processor cores having one or more execution pipelines, instruction and data caches, and the like. The internal input/output modules 130 can include any modules that facilitate data input and data output for the ASIC modules 132, such as display interface modules, bus interface modules, memory interface modules, input/output registers, and the like, or any combination thereof.

The field programmable module 110 is field-programmable gate array (FPGA), complex programmable logic device (CPLD), or similar programmable device that includes a logic array 112 and one or more input/output expansion (IOE) modules 115. The logic array 112 is a set of logic gates that can be programmably configured according to, for example, a hardware description language (HDL), as described further herein. In particular, the HDL describes a particular configuration of the connections between the logic gates of the logic array 112. The HDL can be compiled into an object file, and the object can be "flashed" to the logic array 112 to connect the logic gates according to the configuration.

Each of the IOE modules 115 is configured to perform input/output expansion operations to expand the number of communication protocols that the processing system 102 can use to communicate input/output information between the external input/output modules 104 and the internal input/output modules 130. Accordingly, the IOE modules 115 can, for example, control signal routing and distribution, perform address decoding (e.g. the decoding of address information to identify the target of input/output data), perform activity control for light emitting diodes and other input/output devices, and the like.

The field programmable module 110 can be programmed to perform a variety of operations, including input/output expansion, whereby the IOE modules 115 and the logic array 112 together perform input/output decoding, which increases the available input/output capability of the processing system 102. For example, the field programmable module 110 can be programmed to perform input/output decoding for the particular external input/output modules 104 included at the electronic device 100. This programmability obviates the need to redesign either the ASIC modules 132 or the internal input/output modules 130 for each different type of electronic device that may use the processing system 102. The flexibility of the processing system 102 is thereby enhanced without requiring relatively expensive custom designs.

The field programmable module 110 can also be programmed to perform interface bridging that bridges communications between external devices expecting to communicate via a given protocol and internal modules expecting to communicate via a different protocol. Accordingly, the field programmable module 110 translates bus protocols, voltages, and other signal characteristics between the external input/output modules 104 and the internal input/output devices 130. The processing system 102 can therefore be programmed to communicate with a variety of external input/output devices without requiring either a redesign of hardcoded logic of the processing system 102 or the use of relatively expensive circuit elements (e.g. resistors, capacitors, and the like) incorporated in a printed circuit board of the electronic device 100. The field programmable module 110 thus reduces the cost of using the processing system 102 in a wide variety of electronic devices.

In addition, the field programmable module 110 can be programmed to control the configuration or initialization of other modules of the electronic device 100, including the ASIC modules 132 or other modules (not shown) included on a printed circuit board of the electronic device 100. The field programmable module 110 thus reduces the processing burden on the ASIC modules 132 during system initialization, thereby increasing initialization speed and reducing power consumption during initialization.

The field programmable module 110 can be programmed to perform its operations using an HDL. In some embodiments, the designer of the processing system 102 can provide the designer of the electronic device 100 a set of HDL templates that provide for the operations of the field programmable module 110 according to an expected or model design. The templates can be categorized or organized based on both the internal input/output module 130 and the one or more external input/output modules 104 that are being bridged. The designer of the electronic device 100 can adjust the HDL templates to tailor the particular operations of the field programmable module based on the particular input/output devices used by the electronic device 100. In some embodiments, in addition to the templates, the designer of the processing system 102 can provide a computer aided design (CAD) tool that allows the designer of the electronic device 100 to compile, simulate, and debug the HDL configuration for the logic array 112. The CAD tool can also provide other operations, such as modeling of the behavior of the internal input/output modules 130.

In the illustrated example, the processing system 102 includes a Joint Test Action Group (JTAG) interface 120 connected to a JTAG network 122. The JTAG interface 120 provides an external interface to modules of the processing system 102 that are included in the JTAG network 122. The field programmable module 110 is included in the JTAG chain for the processing system 102. Accordingly, the JTAG interface 120 can be used to upload the programmable object file to the logic array 112 to configure the field programmable module 110. The JTAG interface 120 can also be used to program flash memory (not shown) of the processing system 102.

Figure 2:
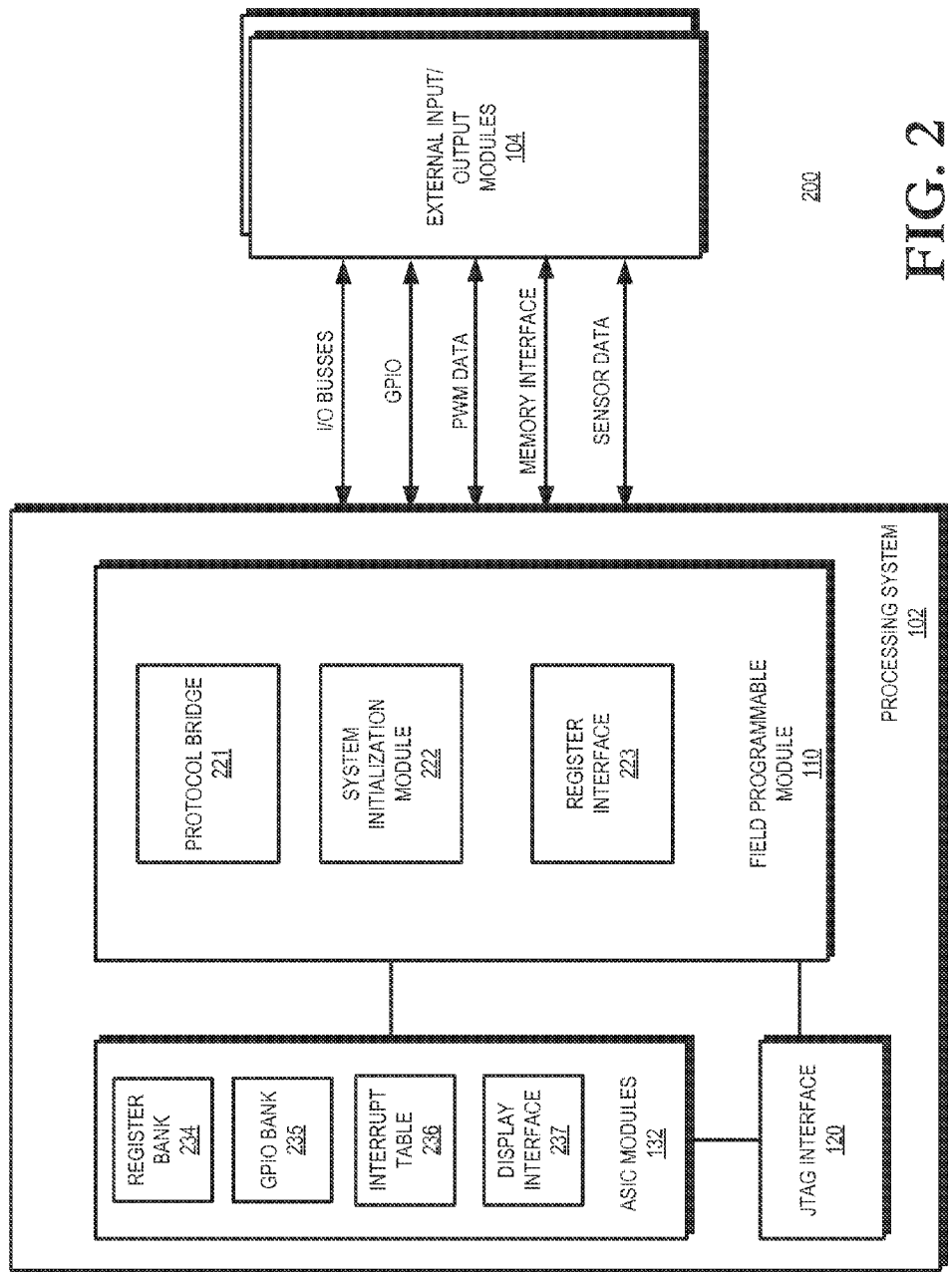
FIG. 2 is a block diagram illustrating an example implementation of operations of the field programmable module of FIG. 1 in accordance with some embodiments.

FIG. 2 illustrates a block diagram of an example implementation of the field programmable module 110 of FIG. 1 in accordance with some embodiments. In the illustrated example, the field programmable module 110 provides an interface bridge between the processing system 102 and the external input/output modules 104. To illustrate, the external input/output modules 104 communicate via sets of signals, whereby each of the sets complies with a particular communication protocol. The sets of signals are referred to as "input/output signals" or "input/output signaling." In the illustrated embodiment, the input/output signals include input/output (I/O) bus signals, general purpose input/output (GPIO) signals, pulse-width modulated (PWM) data signals, memory interface signals, and sensor data signals. The communication protocol for each signal set mandates the characteristics of the signal to communicate particular information. For example, the communication protocol mandates the voltage magnitude, polarity, timing, and other parameters to communicate information to the peripheral module that complies with the communication protocol.

The processing system 102 includes ASIC modules 132 to perform designated processing operations. To assist in these operations, the ASIC modules 132 include a register bank 234, a GPIO bank 235, an interrupt table 236, and a display interface 237. The register bank 234 includes one or more registers for storage of data that is being manipulated by the ASIC modules 132. The GPIO bank 235 is a set of registers where data associated with input/output operations is stored by the ASIC modules 132. The interrupt table 236 is a data structure that indicates, for each type of generated interrupt, the location of the interrupt handler to be executed in response to the corresponding interrupt. The display interface 237 includes modules, such as frame buffers, codecs, image processing modules, and the like, to facilitate the visual display of information.

As explained above, the field programmable module 110 is configured by flashing an object file reflecting an HDL program describing a configuration of logic inputs and outputs. Based on the object file the field programmable module 110 configures the connections between its logic gates so that it produces defined outputs in response to corresponding defined inputs. The field programmable module 110 thus can be configured to perform particular operations on behalf of the processing system 102. In the illustrated example, the field programmable module 110 has been programmed to include a protocol bridge 221, a system initialization module 222, and a register interface 223.

The protocol bridge 221 is configured to provide an interface between the ASIC modules 132 and the external input/output modules 104. In particular, the protocol bridge 221 generates output signals on behalf of the ASIC modules 132 so that the output signals comply with the particular communication protocol of the peripheral module that is the target of the output signal. In addition, for input signals received from the IOE modules 115, the protocol bridge 221 modifies the input signals so that they are in a format that can be understood and processed by the ASIC modules 132. The field programmable module 110 thereby provides, via the protocol bridge, an interface that reduces the need for customized circuitry in an electronic device.

To illustrate, one of the external input/output modules 104 can be a touch screen device selected from a variety of touch screen devices, whereby each of the touch screen devices requires a different communication protocol. In particular, the different communication protocols that potentially could be implemented by the touch screen device may require different voltage magnitudes, voltage polarities, signal timings, and the like, in order to communicate information to and from a processing system. Because of the variety of communication protocols, it is not cost efficient for the processing system 102 to be designed to accommodate each communication protocol. Therefore, an electronic device is conventionally designed to include customized circuitry to ensure that the signaling between the touch screen device and the processing system 102 complies with the multitude of communication protocol that potentially may be implemented by the touch screen device.

In the electronic device 200, the protocol bridge 221 handles generation and modification of the input/output signaling between the processing system 102 and the touch screen device, thereby obviating the need for the customized circuitry. Further, the field programmable module 110 can be programmed so that the protocol bridge 221 complies with any one of the variety of touch screen devices, thereby allowing the processing system 102 to be incorporated into a variety of electronic devices without redesign of the processing system 102 or the design and implementation of customized circuitry at each electronic device. The field programmable module 110 thereby simplifies design of the electronic device 200.

The protocol bridge 221 can perform any of a variety of functions to modify signaling between the processing system 102 and the external input/output modules 104, including modification of a voltage level, a voltage polarity, the timing of transitions of signals, and the like. Further, the protocol bridge 221 can differently modify the signaling for different ones of the external input/output modules 104. Thus, for example, the protocol bridge 221 can modify the voltage levels of the input/output signals between a touch screen and the processing system 102 and modify the polarity of a set of signals between a display device and the processing system 102 or modify the set of signals for the display device according to different voltage levels. The protocol bridge 221 thus adapts the signals to comply with the particular communication protocol associated with each of the input/output modules 104 without requiring customized circuitry to communicate with each device.

The system initialization module 222 is configured to perform system initialization functions, thereby offloading these functions from the ASIC modules 132 and reducing initialization time. Examples of system initialization functions include memory initialization, system configuration determinations (such as whether particular peripheral devices are connected to the electronic device 100), communication of initialization commands or other initialization information to the external input/output modules 104, and the like. The field programmable module 110 can be programmed so that the system initialization module 222 implements an initialization routine that is customized for the electronic device 200. The field programmable module 110 thereby allows the processing system 102 to be flexibly incorporated into a variety of electronic devices having different initialization routines and system configurations.

To illustrate the use of the system initialization module 222, in some embodiments the external input/output modules 104 include a memory module that is to be filled with a predefined pattern of data as part of the initialization routine of the electronic device 200. Accordingly, in response to an indication from the processing system 102 that the initialization routine has been initiated, the system initialization module can communicate with the memory module, provide the defined pattern to the memory module for storage, and determine when the memory module has completed storage of the defined pattern. The processing system 102 is thereby freed to perform other initialization functions, reducing overall initialization time.

The register interface 223 is configured to provide an interface between the external input/output modules 104 and selected registers of the processing system 102. In some embodiments, this interface is separate from any device drivers of the processing system 102. To illustrate, the processing system 102 can execute device drivers, whereby each device driver handles communications between the processing system 102 and the corresponding peripheral device. Amongst other functions, a device driver receives requests from its peripheral device to access (read or write to) registers of the processing system 102. The device driver determines whether the access is permitted, and if so executes the access. Because the device driver is composed of a set of instructions executed at the processing system 102, it must be scheduled for execution along with other executing programs. The register interface 223 can perform similar functionality as the device driver with respect to accessing registers, but can do so directly without waiting to be scheduled for execution at the processing system 102. The register interface 223 can therefore provide for quicker accesses to registers of the processing system 102.

In some embodiments, the register interface 223 restricts access to the registers of the processing system 102 by implementing a masking scheme. In particular, in response to receiving a request to access a register, the register interface 223 masks the address of the register being accessed, the address of the peripheral device requesting access, or a combination thereof to determine an access value, and compares the access value to a stored set of permissions to determine whether the peripheral device is permitted to access the indicated register. If the peripheral device has permission, the register interface 223 completes the access, either by retrieving data from the indicated register or storing data received from the peripheral device to the indicated register. If the peripheral device does not have permission, the register interface 223 does not complete the access. The register interface 223 can also provide status updates to the device driver of the peripheral device that requested access, including providing indications as to which register was requested for access, whether the request was granted, what data was accessed (what data was stored at the register or retrieved by the register) and the like. The device driver is thereby kept up to date as to the registers accessed by its peripheral device.

The processing system 102 includes a Joint Test Action Group (JTAG) interface 120 that provides a debug interface to the ASIC modules 132 for debugging. In addition, the JTAG interface 120 provides an interface to the field programmable module 110. Accordingly the JTAG interface 120 provides a conduit for the hardware programming instructions to configure the field programmable module 110 to perform its designated operations.

Figure 3:
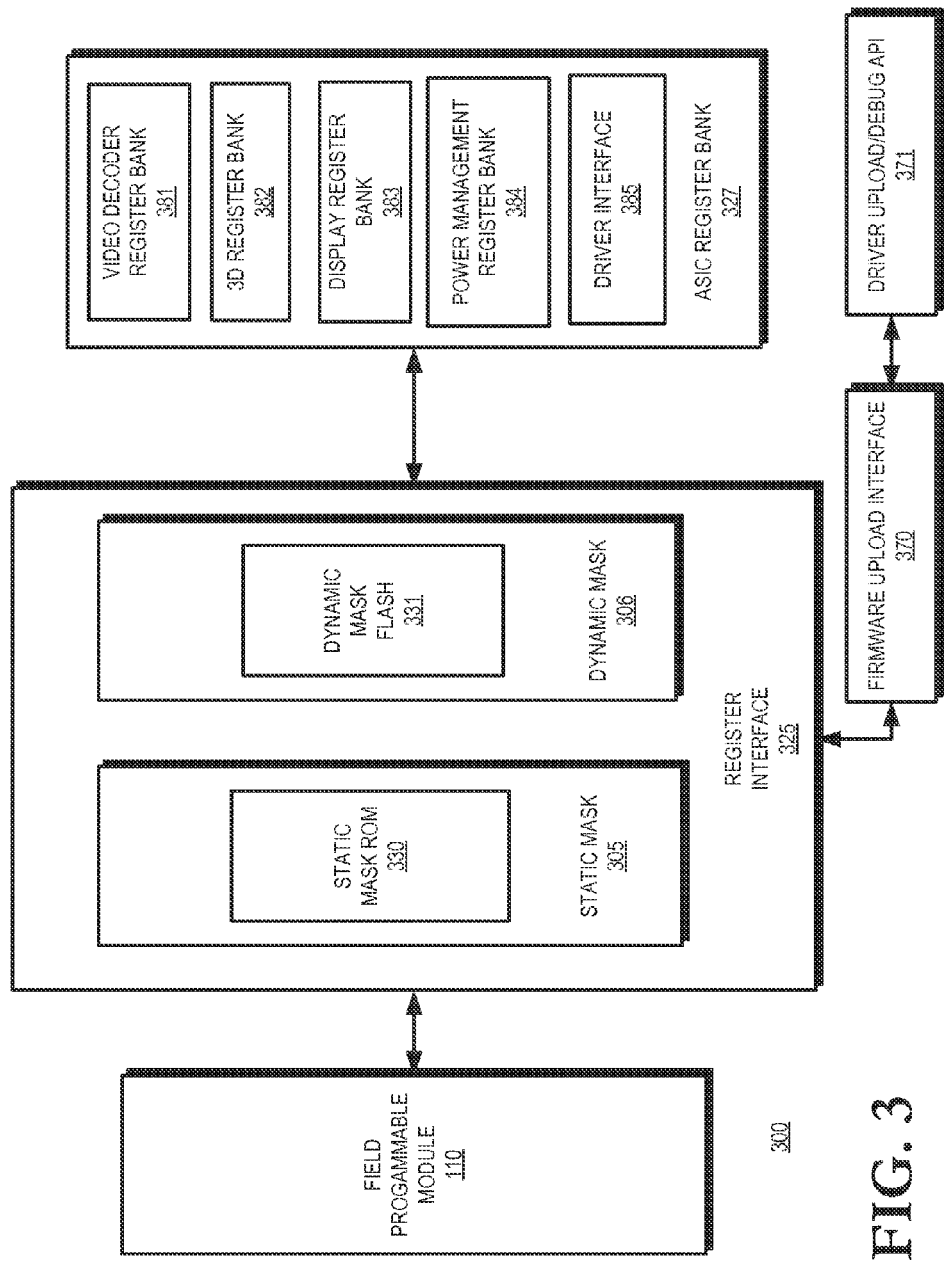
FIG. 3 is a block diagram illustrating a processing system having a register interface between the field programmable module of FIG. 1 and a register bank in accordance with some embodiments.

FIG. 3 illustrates a block diagram of a processing system 300 that uses the field programmable module 110 and a register interface 325 to provide an interface to an ASIC register bank 327. The register interface 325, together with the field programmable module 110, provides a static and dynamic way of controlling fast access to the register bank 327 registers. In some embodiments, the direct register access provided by the field programmable module 110 does not replace access to the ASIC register bank 327 by device drivers, but complements such access by providing a low level (RTL and firmware) limited and fast way of interfacing with the ASIC register bank 327 that does not have to go through layers of driver code.

The register interface 325 includes a static mask module 305 and a dynamic mask module 306. The static mask module 305 includes a static mask read-only memory (ROM) 330 that stores a set of masks that indicate particular registers of the processing system 102 that can be accessed by selected ones of the input/output modules 104. The dynamic mask module 306 includes a dynamic mask flash memory 331 that also stores a set of masks that indicate particular registers of the processing system 102 that can be accessed by selected ones of the input/output modules 104.

In operation, the field programmable module 110 receives requests from peripheral devices to access a register of the ASIC register bank 327. The field programmable module 110 routes these requests to the register interface 325. In response to the request, the static mask module 305 masks the address of the peripheral device using the mask for the register stored at the static mask ROM 330 to determine an authentication value. The register interface 325 compares the authentication value to a security value, which can be predefined or stored at the static mask ROM 330. If the comparison indicates a match, the register interface 325 allows access. If the comparison does not indicate a match, the register interface 325 determines whether the dynamic mask module 306 allows access. In particular, the dynamic mask module 306 masks the address of the peripheral device using the mask for the register stored at the dynamic mask flash memory 331 to determine an authentication value which the register interface 325 compares to a security value (either predefined or stored at the dynamic mask flash memory 331). If the comparison indicates a match, the register interface 325 allows the access by providing the access request to the ASIC register bank 327, which fulfills the request, either by storing data at the register, or by providing data stored at the register to the field programmable module 110 for provision to the peripheral device. If the comparison does not indicate a match, the register interface 325 denies the access by suppressing provision of the request to the ASIC register bank 327. The register interface 325 can perform other functions such as notifying the ASIC modules 132 of the attempt to access the register by a peripheral device that was not authorized. In some embodiments, the functions of the register interface can be programmed into the field programmable module 110 itself.

In the illustrated example of FIG. 3, the ASIC register bank 327 includes a video decoder register bank 381 that provides registers to store information related to video decoding, a 3D register bank 382 that provides registers to store information related to processing of 3-dimensional information for a GPU, a display register bank 383 that provides registers to store information related to display of frames at a display device (e.g. a video monitor), and a power management register bank 384 that provides registers to store information related to placing the ASIC, or on or more modules thereof, into defined power states (e.g. a low-power state or an operational state). The ASIC register bank 327 also includes a driver interface that interfaces with one or more software drivers for peripheral devices to allow the peripheral devices to store and retrieve information from the registers banks 381-385. Accordingly, the processing system 300 provides two ways for a peripheral device to interface with the register banks 381-385: (1) via the register interface 325; and (2) using a device driver to communicate with the driver interface 385. The register interface 325 provides a relatively fast low-level interface with the register banks 381-385, but may also provide a relatively limited access to the registers in order to maintain device security. The driver interface 385 provides a slower interface to the register banks 381-385, but can provide access to more registers, or allow more access (e.g. write access) to the same registers.

The processing system 300 includes a firmware upload interface 370 and a driver upload and debug application program interface (API) 371 to allow a user to create and upload drivers for peripheral devices of the processing system 300. In response to receiving a driver from the API 371, the firmware upload interface 370 can automatically generate dynamic masks for the peripheral device associated with the driver and store the masks at the dynamic mask flash memory 331. The firmware upload interface 370 thus facilitates access to the ASIC register bank 327 both through the uploaded driver and the register interface 325.

Figure 4:
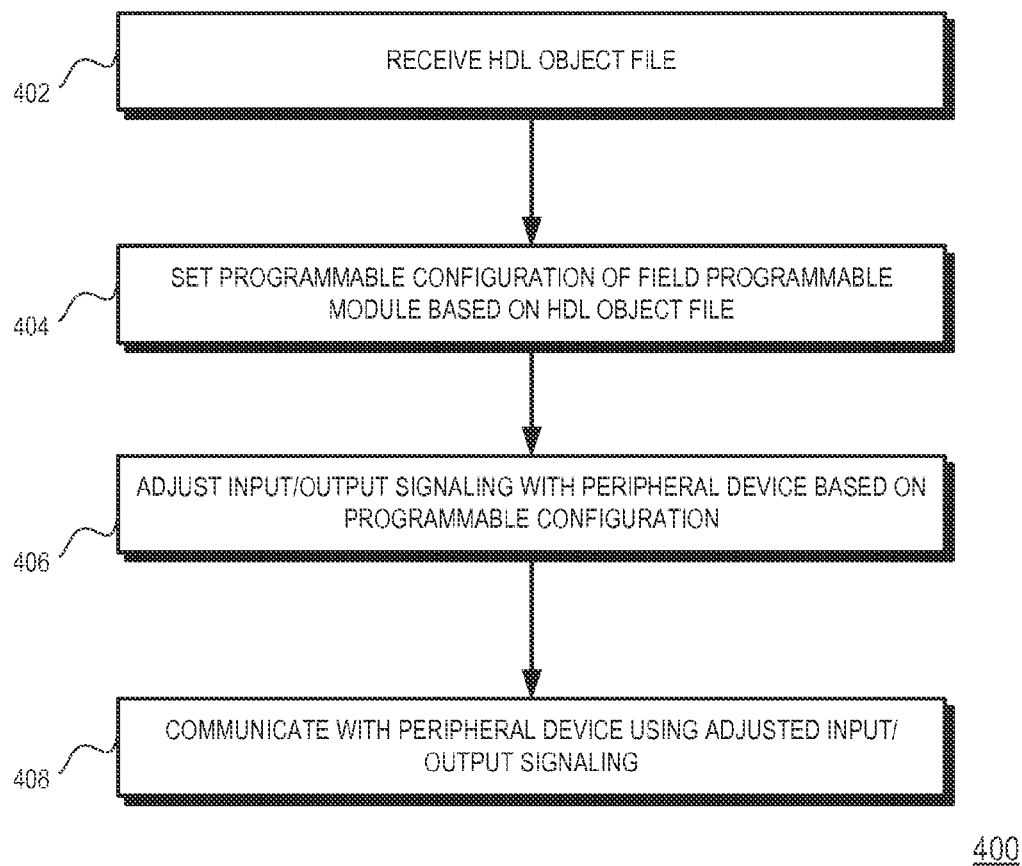
FIG. 4 is a flow diagram of a method of employing a field programmable logic module to provide interface bridging in accordance with some embodiments.

FIG. 4 illustrates a flow diagram of a method 400 of employing a field programmable module to provide an interface between a processing system and external input/output modules in accordance with some embodiments. For purposes of illustration, FIG. 4 is described with respect to an example implementation at the electronic device 100 of FIG. 1. At block 402 the processing system 102 receives an HDL object file for the field programmable module 110 via the JTAG interface 120. The object file represents the desired configuration of the field programmable module 110 and can be based on any hardware configuration language, such as HDL. In some embodiments, the configuration information can be developed using one or more design tools, such as computer aided design (CAD) software that automatically generates the configuration information based on input parameter information. For example, the input parameter information can define the communication protocol for each of the external input/output modules 104 of the electronic device 100, and the CAD software can generate the configuration information so that the field programmable module 110 will modify the signaling between the processing system 102 and the external input/output modules 104 according to the communication protocols.

At block 404 the processing system 102 configures the logic gates and other modules of the field programmable module 110 based on the object file. In particular, the field programmable module 110 is configured so that it can make the modifications to the input/output signaling of the processing system 102 as required by the received object file. At block 406 the field programmable module 110 adjusts the input/output signaling between the ASIC modules 132 and the external input/output modules 104 based on the configuration information. For example, the field programmable module 110 can adjust the voltage magnitudes of the input/output signaling, the polarity, the communication protocol associated with the input/output signaling, and the like, so that the input/output signaling is placed in the appropriate format, either for reception by the ASIC modules 132 (in the case of signaling received from one of the input/output modules 104) or for provision to one of the input/output modules 104 (in the case of signaling generated by the ASIC modules 132. At block 408 the processing system 102 communicates with one or more of the input/output modules 104 using the adjusted input/output signaling.

Figure 5:
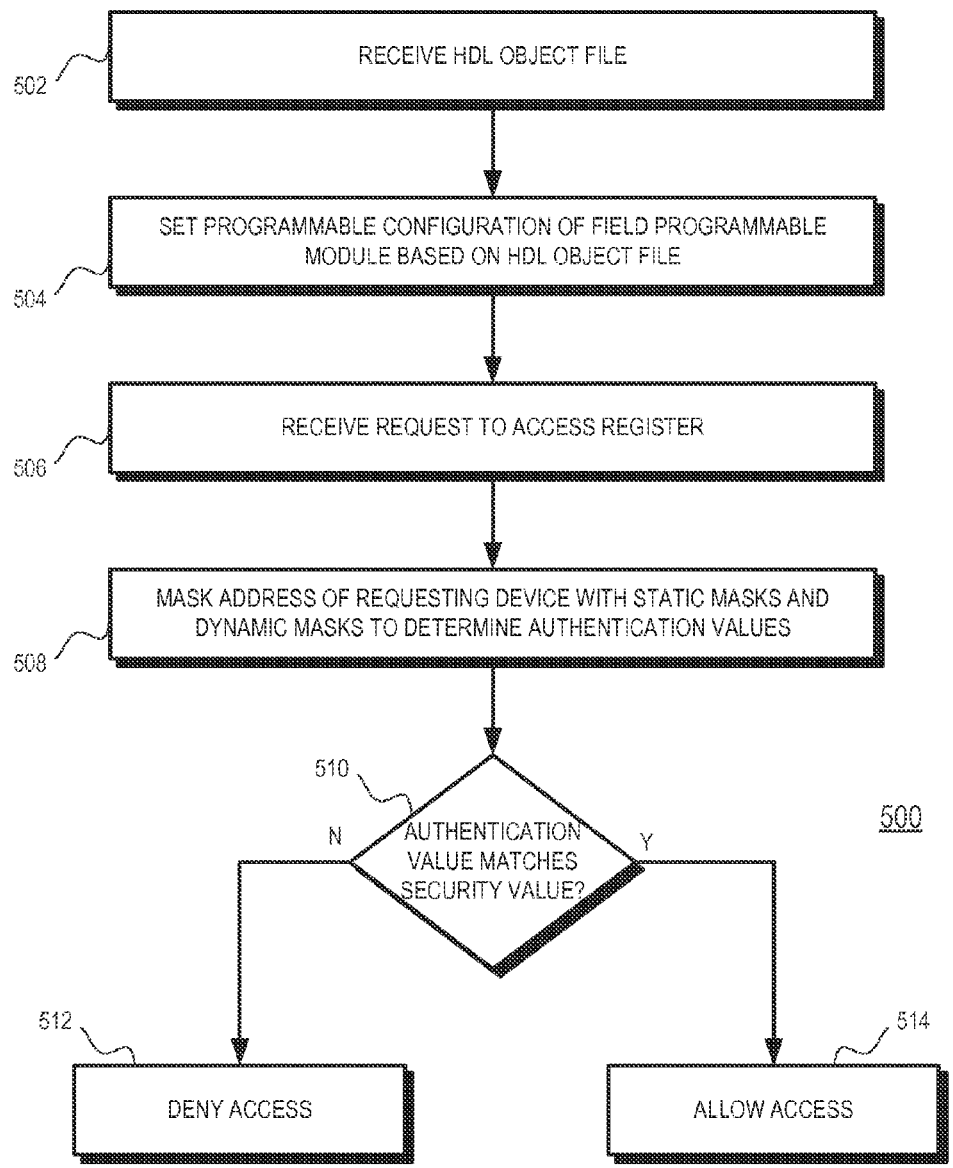
FIG. 5 is a flow diagram of a method of employing a field programmable logic module to provide a register interface in accordance with some embodiments.

FIG. 5 illustrates a flow diagram of a method 500 of employing a field programmable module to provide an interface between a processing system and peripheral modules in accordance with some embodiments. For purposes of illustration, FIG. 5 is described with respect to an example implementation at the electronic device 100 of FIG. 1. At block 502 the processing system 102 receives programmable configuration information for the field programmable module 110 via the JTAG interface 120. The configuration information represents the desired configuration of the field programmable module 110. At block 504 the processing system 102 configures the logic gates and other modules of the field programmable module 110 based on the configuration information. In particular, the field programmable module 110 is configured so that it can provide an interface between the input/output modules 104 and the registers of the processing system 102.

At block 506 the field programmable module 110 receives a request from one of the external input/output modules 104 to access a register of the processing system 102. In response, at block 508 the field programmable module 110 applies static and dynamic masks to the address of the requesting peripheral device to determine one or more authentication values. At block 510 the field programmable module 110 determines if any of the authentication values matches a security value associated with the register to be accessed. If none of the authentication values matches the security value, the method flow moves to block 512 and the field programmable module 110 denies the access request. If at least one of the authentication values matches the security value the method flow moves to block 514 and the field programmable module 110 allows the requesting peripheral device to access the register.

In some embodiments, the apparatus and techniques described above are implemented in a system comprising one or more integrated circuit (IC) devices (also referred to as integrated circuit packages or microchips), such as the processing system described above with reference to FIGS. 1-5. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 6:
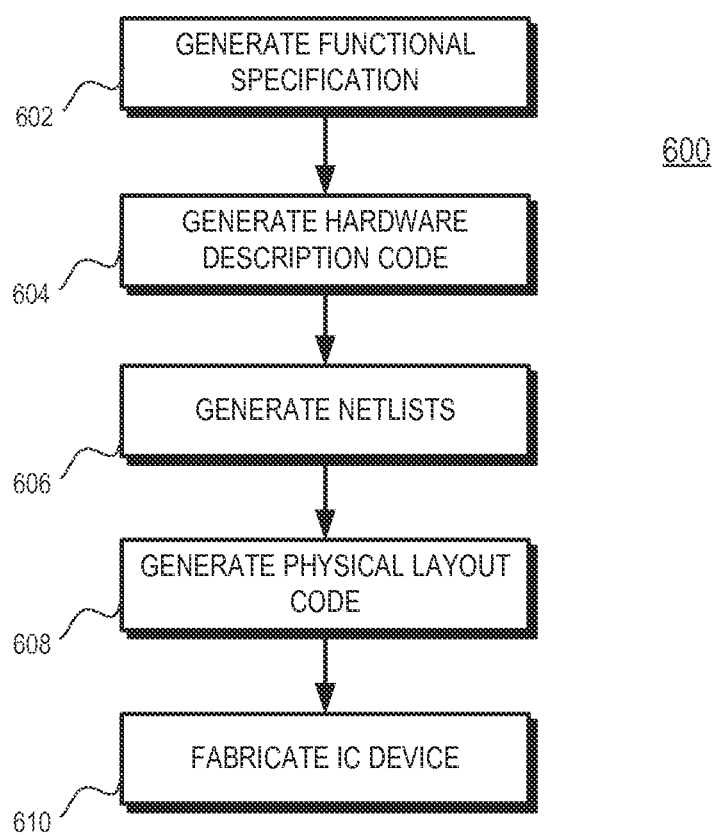
FIG. 6 is a flow diagram illustrating a method for designing and fabricating an integrated circuit device implementing at least a portion of a component of a processing system in accordance with some embodiments.

FIG. 6 is a flow diagram illustrating an example method 600 for the design and fabrication of an IC device implementing one or more aspects in accordance with some embodiments. As noted above, the code generated for each of the following processes is stored or otherwise embodied in computer readable storage media for access and use by the corresponding design tool or fabrication tool.

At block 602 a functional specification for the IC device is generated. The functional specification (often referred to as a micro architecture specification (MAS)) may be represented by any of a variety of programming languages or modeling languages, including C, C++, SystemC, Simulink, or MATLAB.

At block 604, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 606 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 608, one or more EDA tools use the netlists produced at block 606 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 610, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions stored on a computer readable medium that, when executed by the one or more processors, manipulate the one or more processors to perform one or more aspects of the techniques described above. The software is stored or otherwise tangibly embodied on a computer readable storage medium accessible to the processing system, and can include the instructions and certain data utilized during the execution of the instructions to perform the corresponding aspects.

As disclosed herein, in some embodiments a method include programming a field programmable module to have a programmable configuration to adjust at least one parameter of input/output signaling of a processing system; and communicating with a peripheral device using the adjusted input/output signaling. In some aspects the at least one parameter includes a voltage magnitude of the input/output signaling. In some aspects the at least one parameter includes a polarity of the input/output signaling. In some aspects programming the field programmable module comprises programming the field programmable module to implement a specified communication protocol for the input/output signaling. In some aspects the method includes initializing the processing system based on the programmable configuration of the field programmable module. In some aspects the method includes programming the field programmable module to have the programmable configuration based on information received via a debug interface of the processing system. In some aspects the method includes receiving, at the field programmable module, a request from the peripheral device to access a register of the processing system; and providing access to the register in response to determining, at the field programmable module, that the peripheral device has permission to access the register. In some aspects determining that the peripheral device has permission to access the register comprises masking the request at the field programmable module based on a first mask. In some aspects determining the peripheral device has permission to access the register comprises masking the request at the field programmable module based on a second mask, the first mask being a static mask that is not programmable via a firmware interface and the second mask being a dynamic mask that is programmable via the firmware interface.

In some embodiments, a method includes programming a field programmable module to have a programmable configuration; and authorizing a peripheral device to access a register of a processing system in response to determining based on the programmable configuration at the field programmable module of the processing system that the peripheral device has permission to access the register. In some aspects the method includes updating a device driver associated with the peripheral device in response to allowing the peripheral device to access the register. In some aspects determining at the field programmable module that the peripheral device has permission to access the register comprises masking the request at the field programmable module based on a first mask. In some aspects determining at the field programmable module that the peripheral device has permission to access the register comprises masking the request at the field programmable module based on a second mask, the first mask being a static mask that is not programmable via a firmware interface and the second mask being a dynamic mask that is programmable via the firmware interface.

In some embodiments, a processing system includes: a field programmable module having a programmable configuration to adjust input/output signaling of the processing system, the processing system to communicate with a peripheral device with the adjusted input/output signaling. In some aspects the field programmable module is to change a voltage magnitude of the input/output signaling. In some aspects the field programmable module is to change a polarity of the input/output signaling. In some aspects the field programmable module is to change a communication protocol associated with the input/output signaling. In some aspects the field programmable module is to store initialization information, the processing system to initialize based on the initialization information. In some aspects the processing system includes a debug interface to receive information to program the field programmable module to have the programmable configuration. In some aspects the field programmable module is to: receive a request from the peripheral device to access a register of the processing system; and based on the programmable configuration, provide the request to the register in response to determining that the peripheral device has permission to access the register.

In some embodiments, a computer readable medium stores code to adapt at least one computer system to perform a portion of a process to fabricate at least part of a processing system, the processing system including a field programmable module having a programmable configuration to adjust input/output signaling of the processing system, the processing system to communicate with a peripheral device with the adjusted input/output signaling.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method, comprising:
   programming, at processing system, a field programmable module to have a programmable configuration that adjusts at least one parameter of input/output signaling of the processing system, the at least one parameter including at least one of a voltage magnitude of the input/output signaling and a polarity of the input/output signaling;
   communicating, at the processing system, with a peripheral device using the adjusted input/output signaling, the peripheral device selected from a group consisting of: a display interface, wireless radio, audio device interface, and a bus interface of the processing system;
   receiving, at the field programmable module, a request from the peripheral device to access a register of the processing system; and
   providing access to the register in response to determining, at the field programmable module, that the peripheral device has permission to access the register.

2. The method of claim 1, wherein the at least one parameter includes a voltage magnitude of the input/output signaling.

3. The method of claim 1, wherein the at least one parameter includes a polarity of the input/output signaling.

4. The method of claim 1, wherein programming the field programmable module comprises programming the field programmable module to implement a specified communication protocol for the input/output signaling.

5. The method of claim 1, further comprising:
   initializing the processing system based on the programmable configuration of the field programmable module.

6. The method of claim 1, further comprising:
   programming the field programmable module to have the programmable configuration based on information received via a debug interface of the processing system.

7. The method of claim 1, wherein determining that the peripheral device has permission to access the register comprises masking the request at the field programmable module based on a first mask.

8. The method of claim 7, wherein determining the peripheral device has permission to access the register comprises masking the request at the field programmable module based on a second mask, the first mask being a static mask that is not programmable via a firmware interface and the second mask being a dynamic mask that is programmable via the firmware interface.

9. A method, comprising:
   programming, at a processing system, a field programmable module to have a programmable configuration; and
   authorizing, at the processing system, a peripheral device to access a register of the processing system in response to determining based on the programmable configuration at the field programmable module of the processing system that the peripheral device has permission to access the register;
   wherein determining at the field programmable module that the peripheral device has permission to access the register comprises masking the request at the field programmable module based on a first mask and masking the request at the field programmable module based on a second mask, the first mask being a static mask that is not programmable via a firmware interface and the second mask being a dynamic mask that is programmable via the firmware interface.

10. The method of claim 9, further comprising:
    updating a device driver associated with the peripheral device in response to allowing the peripheral device to access the register.

11. A processing system, comprising:
    a field programmable module having a programmable configuration to adjust input/output signaling of the processing system by adjusting at least one of a voltage magnitude of the input/output signaling and a polarity of the input/output signaling, the processing system to communicate with a peripheral device with the adjusted input/output signaling, the peripheral device selected from the group consisting of: a display interface, wireless radio, audio device interface, and a bus interface of the processing system; and
    wherein the field programmable module is to:
       receive a request from the peripheral device to access a register of the processing system; and
       based on the programmable configuration, provide the request to the register in response to the determining that the peripheral device has permission to access the register.

12. The processing system of claim 11, wherein the field programmable module is to change a voltage magnitude of the input/output signaling.

13. The processing system of claim 11, wherein the field programmable module is to change a polarity of the input/output signaling.

14. The processing system of claim 11, wherein the field programmable module is to change a communication protocol associated with the input/output signaling.

15. The processing system of claim 11, wherein the field programmable module is to store initialization information, the processing system to initialize based on the initialization information.

16. The processing system of claim 11, further comprising:
    a debug interface to receive information to program the field programmable module to have the programmable configuration.

* * * * *